US012482981B2

(12) United States Patent
Yin et al.

(10) Patent No.: US 12,482,981 B2
(45) Date of Patent: Nov. 25, 2025

(54) ELECTRICAL CONNECTOR WITH AN IMPROVED WATERPROOF COVER

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Ting-Ting Yin, Kunshan (CN); Jian-Kuang Zhu, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 290 days.

(21) Appl. No.: 18/234,052

(22) Filed: Aug. 15, 2023

(65) Prior Publication Data

US 2025/0062566 A1 Feb. 20, 2025

(51) Int. Cl.
*H01R 13/40* (2006.01)
*H01R 13/52* (2006.01)

(52) U.S. Cl.
CPC ......... *H01R 13/5213* (2013.01); *H01R 13/40* (2013.01); *H01R 13/5202* (2013.01)

(58) Field of Classification Search
None
See application file for complete search history.

(56) References Cited

U.S. PATENT DOCUMENTS

| | | | | |
|---|---|---|---|---|
| 7,090,532 B1 * | 8/2006 | Kaine | H01R 13/523 | 439/523 |
| 8,618,416 B2 * | 12/2013 | Rothbaurer | H01R 13/5213 | 174/67 |
| 2003/0032321 A1 * | 2/2003 | Wertz | H01R 13/6277 | 439/282 |

FOREIGN PATENT DOCUMENTS

| | | |
|---|---|---|
| CN | 202259919 U | 5/2012 |
| CN | 210224415 U | 3/2020 |
| CN | 210607787 U | 5/2020 |
| CN | 211456029 U | 9/2020 |
| CN | 215299680 U | 12/2021 |

* cited by examiner

*Primary Examiner* — Tho D Ta
(74) *Attorney, Agent, or Firm* — Ming Chieh Chang

(57) ABSTRACT

An electrical connector assembly includes: an electrical connector defining a front face, a receiving cavity opening through the front face with a first cavity face and a second cavity face opposite to each other; and a waterproof cover comprising a tube portion and a cover portion, wherein the tube portion defines an inner ring rib at an inner side thereof and an outer ring rib at an outer side thereof, and the inner face ring presses against the first cavity face and the outer ring rib presses against the second cavity face after the tube portion is inserted in the receiving cavity and the cover portion covers the front face of the electrical connector.

10 Claims, 8 Drawing Sheets

ELECTRICAL CONNECTOR WITH AN IMPROVED WATERPROOF COVER

BACKGROUND OF THE INVENTION

1. Field of the Invention

The present invention relates to an electrical connector with an improved waterproof cover.

2. Description of Related Arts

China Patent No. 210607787 discloses an electrical connector with a dustproof function, which includes a main body and a shell. A waterproof ring is arranged between the main body and the shell so that water cannot enter into the connector through the dustproof cover. A dustproof cover is disposed and retained to the connector.

An improved electrical connector is desired.

SUMMARY OF THE INVENTION

The instant invention is to provide an electrical connector with an improved waterproof cover.

To achieve the above-mentioned object, an electrical connector assembly comprises: an electrical connector defining a front face, a receiving cavity opening through the front face with a first cavity face and a second cavity face opposite to each other; and a waterproof cover comprising a tube portion and a cover portion; wherein the tube portion defines an inner ring rib at an inner side thereof and an outer ring rib at an outer side thereof, and the inner face ring presses against the first cavity face and the outer ring rib presses against the second cavity face after the tube portion is inserted in the receiving cavity and the cover portion covers the front face of the electrical connector.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
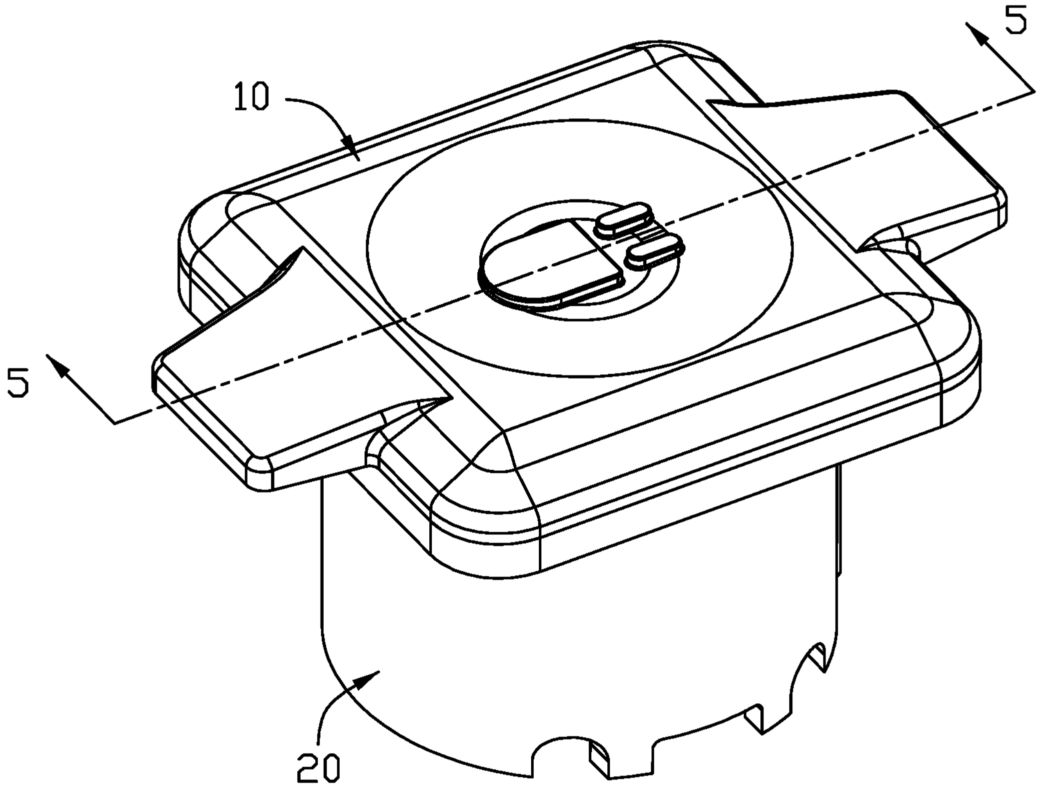
FIG. 1 is a top perspective view of an electrical connector assembly of a first embodiment in accordance with the present invention.
Figure 2:
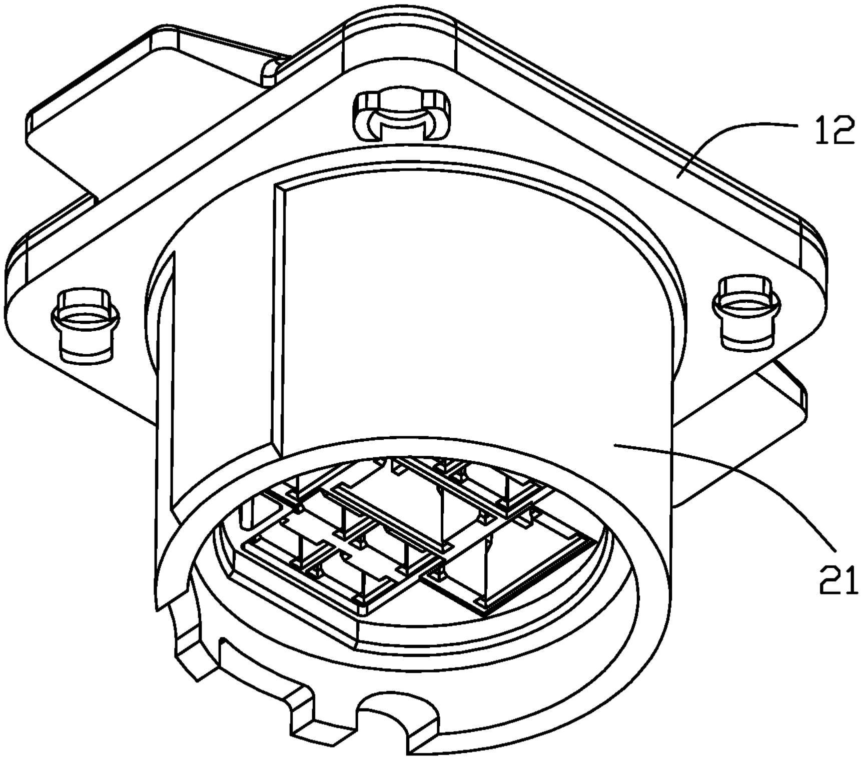
FIG. 2 is a bottom perspective view of the electrical connector assembly in FIG. 1.
Figure 3:
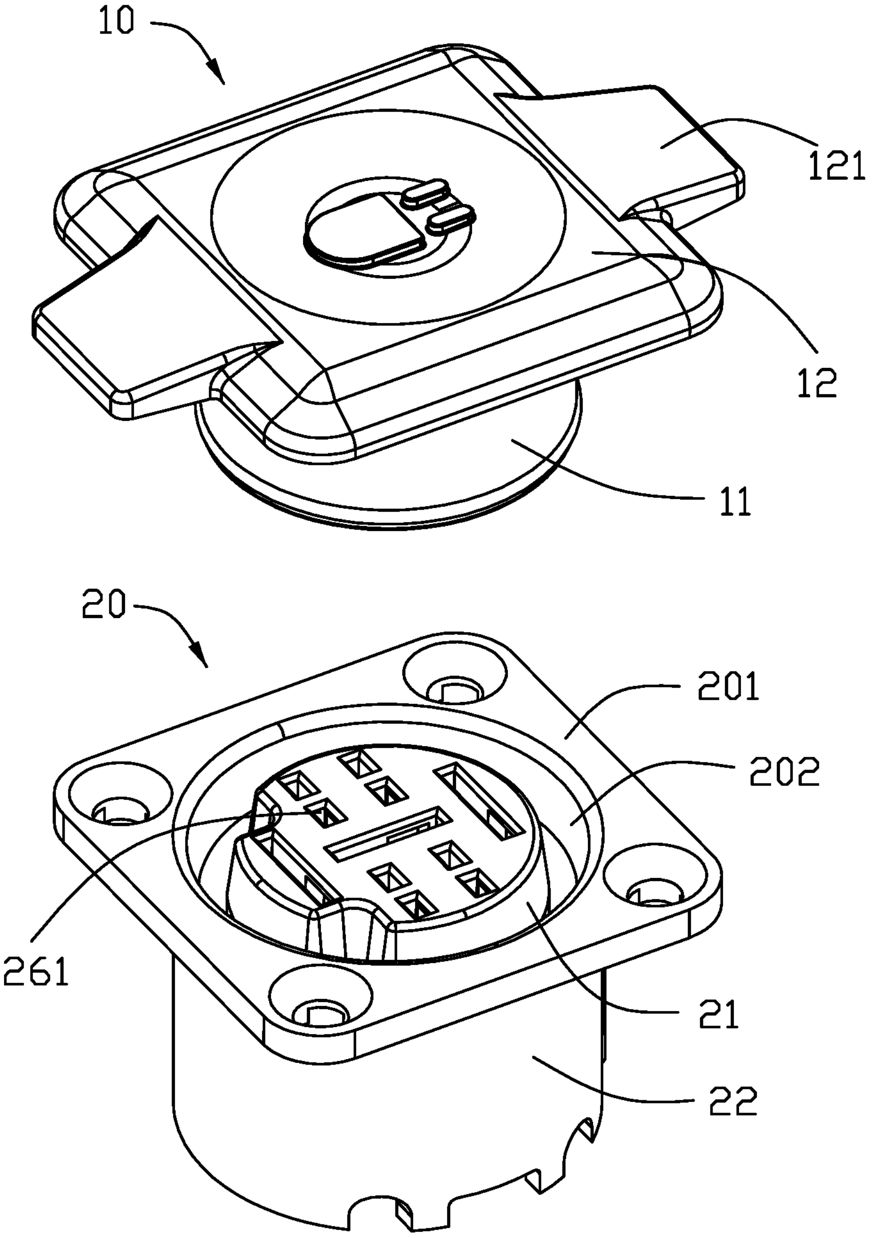
FIG. 3 is a perspective view of the electrical connector assembly in FIG. 1, wherein the waterproof is detached from the electrical connector.
Figure 4:
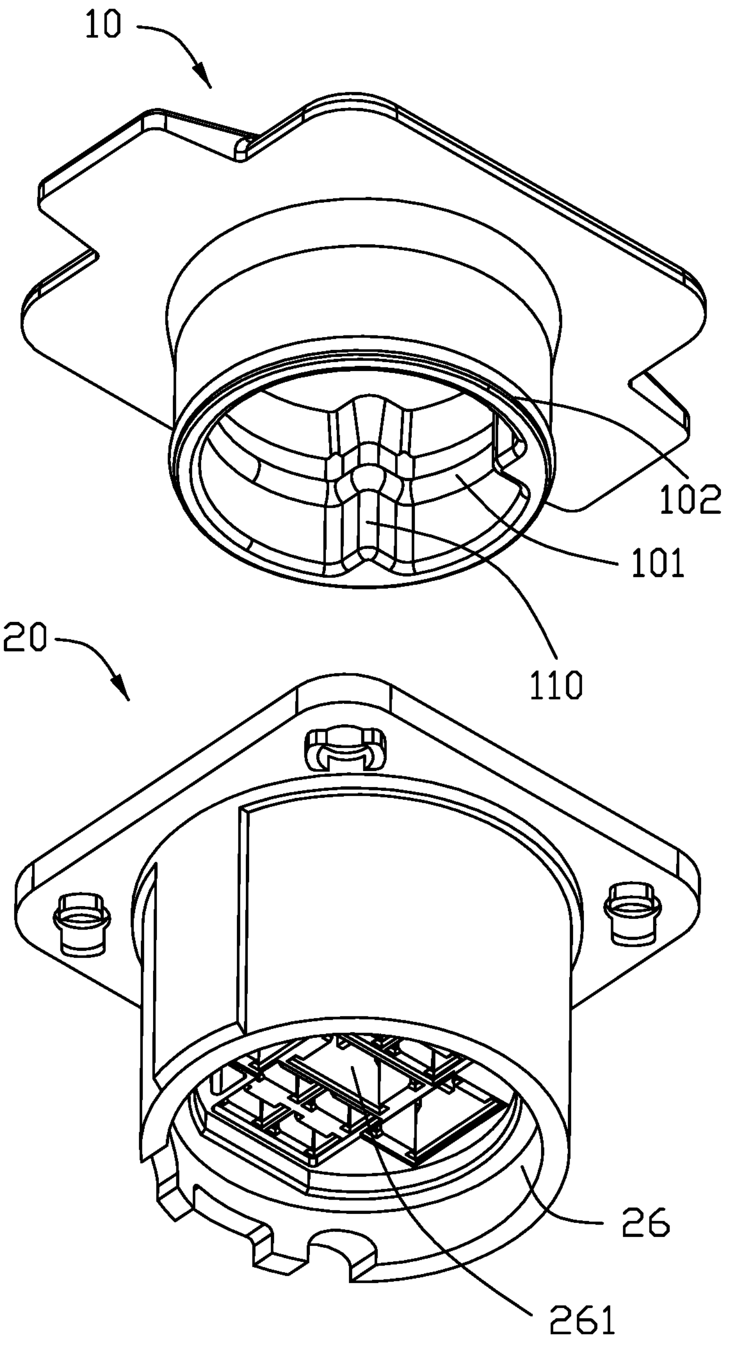
FIG. 4 is a perspective view of the electrical connector assembly in FIG. 2, wherein the waterproof is detached from the electrical connector.
Figure 5:
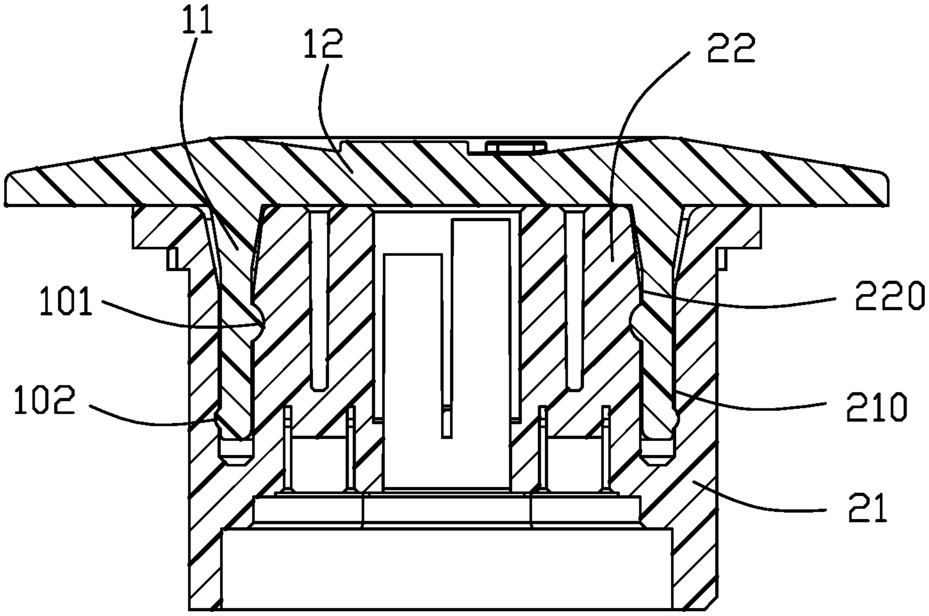
FIG. 5 is a cross-sectional view of the electrical assembly taken along line 5-5 in FIG. 1.

Reference will now be made in detail to the preferred embodiments of the present invention.

Referring to FIGS. 1-5 illustrating an electrical connector assembly of this embodiment, the electrical connect assembly includes an electrical connector 20 and a waterproof cover 10, the waterproof 10 covers a front face of the electrical connector 20 and prevents the electrical connector 20 from entering of water during a water testing process. The cover 10 includes a tube portion 11 and a cover portion 12 at one end of the tube portion 11 opposite to another opening end of the tube portion 11. The tube portion 11 defines an inner ring rib 101 protruding from an inner face of the tube portion 11 and an outer ring rib 102 protruding from an outer face of the tube portion 11.

The inner ring rib 101 and the outer ring rib 102 are offset in an axial direction of the tube portion 11, the outer ring rib 102 is proximate to the opening of the tube portion 11, the inner ring rib 102 is proximate to a middle portion along the axial direction. The cover portion 12 protrudes outwards and beyond the tube portion 11 in a radial direction of the tube portion 10, in a substantial square shape in the axial direction, and further includes a handing portion 121 from two opposite sides of the square shape. The tube portion 11 defines a key portion 110 from the inner face thereof, the key portion 110 is of a longitudinal rib extending in the axial direction. The key portion 110 is disposed perpendicularly to the inner ring rib 101. There are two key portions in this embodiment.

The electrical connector 20 defined a front face 201, a receiving cavity 202 opening through the front face 201, the receiving cavity 202 is of a ring recess that defines a first cavity face 220 and a second cavity face 210 opposite to the first cavity face 220. The electrical connector 20 includes a mating portion 21 and a wall portion 22 surrounding the mating portion 21 along the axial direction. The receiving cavity 202 is defined between the mating portion 21 and the wall portion 22, the first cavity face 220 is disposed on the mating portion 21 and the second cavity face 210 is disposed on the wall portion 22. The electrical connector 20 includes a housing 26 made from an insulating material, the housing includes the mating portion 21 and the wall portion 22, a plurality of terminal passageways 261 running through the mating portion to receive corresponding terminals (not shown).

After the cover 10 is assembled to the electrical connector 20, the tube portion 11 is inserted into the receiving cavity 202 of the connector 20, the mating portion 22 is inserted within the tube portion 11. Therefore, the cover portion 12 fitly covers and seals the front face 201 of the electrical connector 20, to preventing water or other liquid from entering into the connector 20. The inner ring rib 101 press against the first cavity face 220, the outer ring rib 102 presses against the second cavity face 210 in the axial direction. Therefore, the receiving cavity 202 is sealed by two ring ribs, improving a waterproof area and waterproof distance. Meanwhile, the inserting force is improved. The mating portion 22 defines key groove to mate with the key portion 110 to get an accurate guidance.

Figure 6:
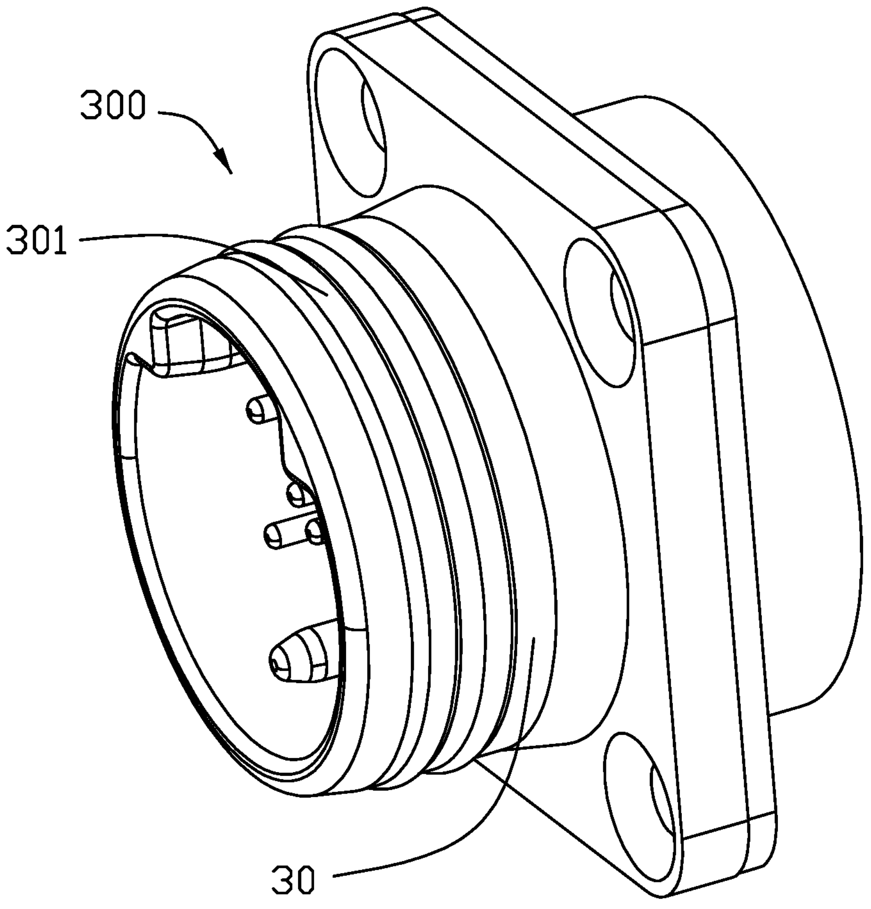
FIG. 6 is a perspective view of an electrical connector of a second embodiment.
Figure 7:
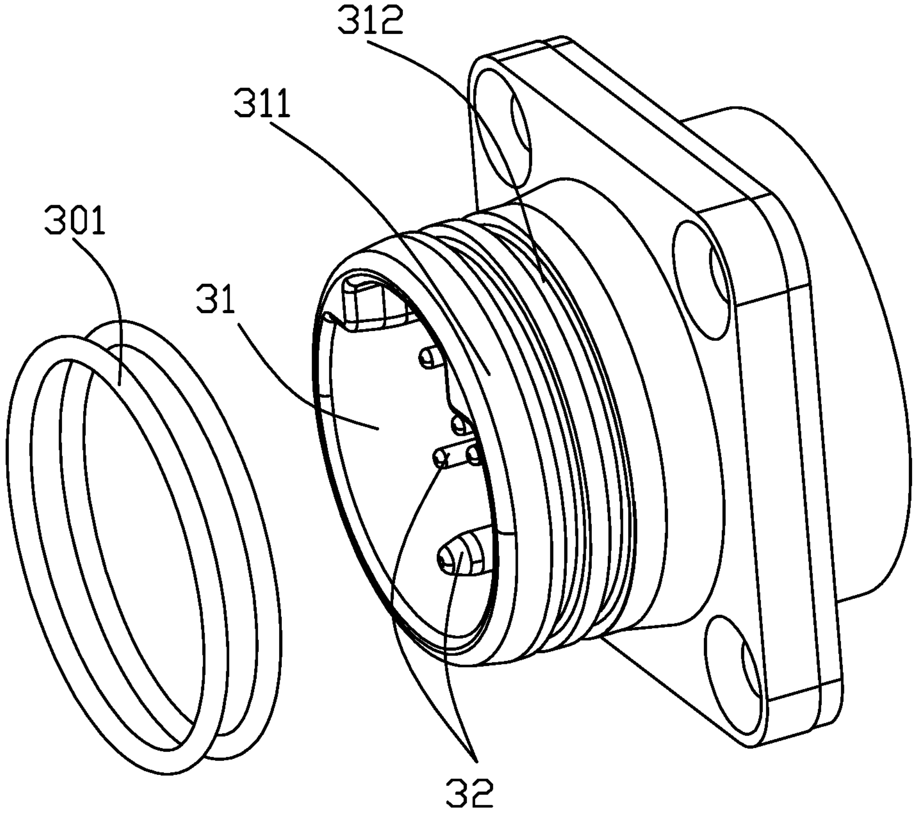
FIG. 7 is a exploded perspective view of the electrical connector in FIG. 6.

Referring to FIGS. 6-7, an electrical connector 300 is illustrated, which includes a housing 30 and two waterproof rings 301 at an outer side of the housing 30. The waterproof distance of the connector is improved. Moreover, the housing includes a tube portion 31 with a mating cavity 311, two ring grooves 312 defined along the tube portion 31. A plurality of conductive terminals 32.

Figure 8:
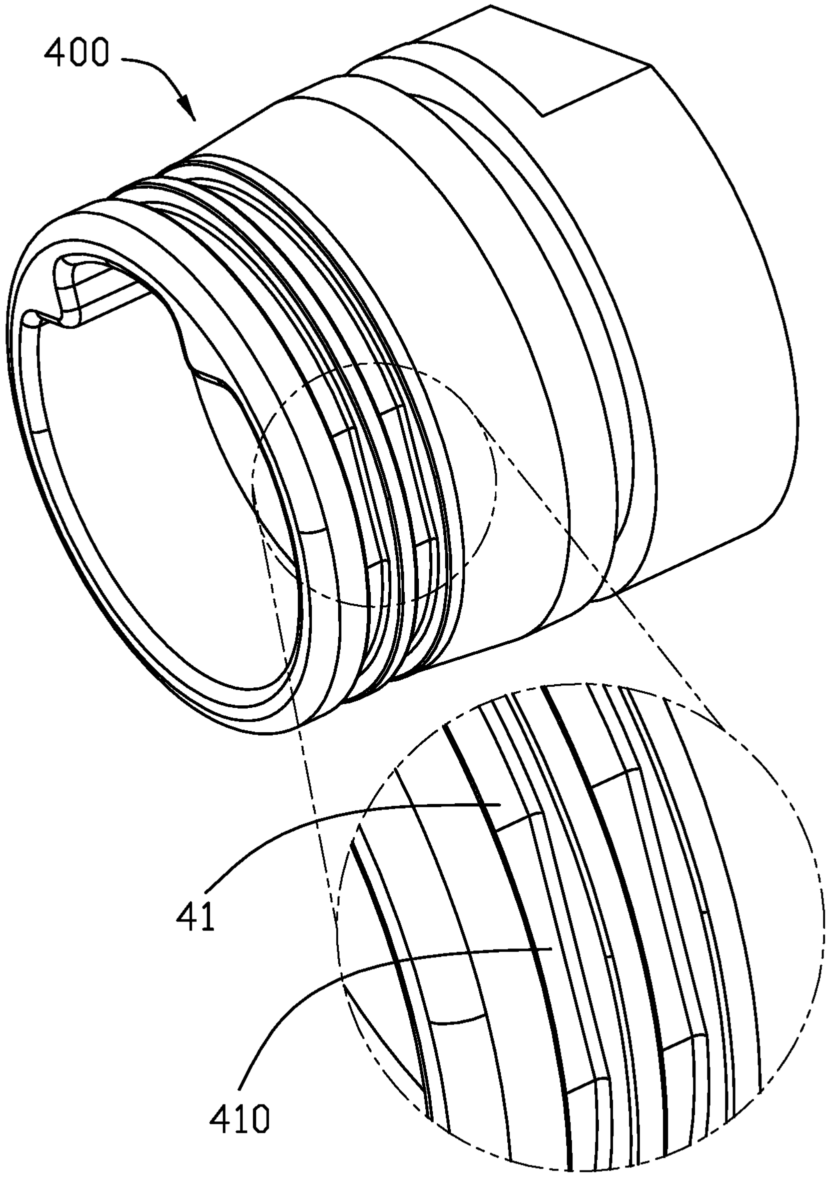
FIG. 8 is a perspective view of an electrical connector of a third embodiment.

Referring to FIG. 8, an electrical connector 400 is illustrated, which includes a housing 40 and two waterproof rings, the housing defines two ring grooves 41 and the waterproof rings are set in the ring grooves 41. The ring groove 41 defines one or more planar floor 410 therein. After the waterproof rings are set in the ring grooves, there are a gap between the waterproof ring and planar floor 410 for gas discharge. The construe of ring grooves 41 with planar floor of the electrical connector 400 can also be used in the electrical connector 300.

Although the present invention has been described with reference to particular embodiments, it is not to be construed as being limited thereto. Various alterations and modifications can be made to the embodiments without in any way departing from the scope or spirit of the present invention as defined in the appended claims.

The invention claimed is:

1. An electrical connector assembly comprising:

an electrical connector defining a front face, a receiving cavity opening through the front face with a first cavity face and a second cavity face opposite to each other; and a waterproof cover comprising a tube portion and a cover portion;

wherein the tube portion defines an inner ring rib at an inner side thereof and an outer ring rib at an outer side thereof, and the inner ring rib presses against the first cavity face and the outer ring rib presses against the second cavity face after the tube portion is inserted in the receiving cavity and the cover portion covers the front face of the electrical connector.

2. The electrical connector assembly as claimed in claim 1, wherein the electrical connector comprises a mating portion and a wall portion surrounding the mating portion, and the receiving cavity is defined between the mating portion and the wall portion.

3. The electrical connector assembly as claimed in claim 2, wherein the first cavity face is defined on an outer side of the mating portion, and the second cavity face is defined on an inner side of the wall portion.

4. The electrical connector assembly as claimed in claim 3, wherein the mating portion defines a plurality of the terminal passageways running through the front face of the electrical connector to receive conductive terminals.

5. The electrical connector assembly as claimed in claim 4, wherein the tube portion defines a key portion, and the mating portion defines a key groove to receive the key portion.

6. The electrical connector assembly as claimed in claim 5, wherein the key portion is a longitudinal rib disposed along an axis direction of the tube portion.

7. The electrical connector assembly as claimed in claim 1, wherein the inner ring rib and the outer ring rib are offset along an axis direction of the tube portion.

8. The electrical connector assembly as claimed in claim 7, wherein the outer ring rib is located proximate to the front face, and the inner ring rib is proximate to a middle portion of the tube portion in the axis direction of the tube portion.

9. A waterproof cover adapted for covering a front face of an electrical connector, the waterproof cover comprising:

a cover portion covering the front face of the electrical connector; and a tube portion unitarily perpendicularly extending from the cover portion;

wherein the tube portion defines an inner ring rib at an inner side thereof and an outer ring rib at an outer side thereof, and the inner ring rib and the outer ring rib are perpendicular to an axis direction of the tube portion;

wherein the tube portion defines a key portion at the inner side thereof, and the key portion is a longitudinal rib disposed along the axis direction of the tube portion.

10. The waterproof cover as claimed in claim 9, wherein the outer ring rib is located proximate to the front face, and the inner ring rib is proximate to a middle portion of the tube portion in an axis direction of the tube portion.

* * * * *